2,883,428
PREPARATION OF 1,1-DICHLORO-2,2-DIPHENYLETHANES

Joseph W. Nemec, Philadelphia, and Charles H. McKeever, Meadowbrook, Pa., assignors to Rohm & Haas Company, Philadelphia, Pa., a corporation of Delaware No Drawing. Application October 3, 1957
Serial No. 688,093

7 Claims. (Cl. 260—613)

This invention deals with a process for preparing 1,1-dichloro-2,2-diphenylethanes of the structure

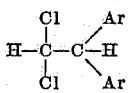

wherein Ar represents phenyl, chlorophenyl, bromophenyl, fluorophenyl, alkylphenyl, including methylphenyl, ethylphenyl, isopropylphenyl, n-propylphenyl and the various butylphenyl groups, methoxyphenyl, and similar activated phenyl groups, including the β-chloroethoxyphenyl group. The two Ar groups may be the same or different.

The process of this invention comprises mixing an aromatic compound of the benzene series and the chlorinated product obtained by reacting at 10° to 50° C. ethanol with chlorine until the resulting chlorinated substances form two layers, adding sulfuric acid to the resulting reaction product, preferably with the temperature between about 0° and 40° C., while the pressure above this mixture is held below 300 mm. pressure, the amount of sulfuric acid added being about 0.5 mole to 2 mole per mole of said aromatic compound, and maintaining the mixture containing sulfuric acid between 40° and 75° C. at a pressure below 200 mm. until evolution of hydrogen chloride is substantially complete. Under preferred conditions, the pressure is held below 100 mm. during the above steps.

The process which is here described and claimed constitutes an improvement over the method described in United States Patent No. 2,464,600, wherein there is described the condensation of an aromatic compound of the benzene series and the halogenated product obtained by halogenating ethyl alcohol between 10° and 50° C. These condensates are highly useful pesticidal agents. In the process of this patent, an amount of condensing agent is used which is at least equal molecularly to the aromatic compound and is preferably used in considerable excess thereover. Also, the addition of condensing agent and the condensation are performed at about normal atmospheric pressures.

While United States Patent 2,464,600 provided a distinct advance in the art, we have now found a method which offers advantages over the process of this patent in various respects. For instance, a relatively smaller proportion of condensing agent can now be used to give yields which previously usually required rather large excesses of such agent. Our new method permits more rapid reaction. With smaller proportions of condensing agent and shorter times of reaction the efficiency of preparation is greatly increased, a given size of reaction equipment providing a greatly increased output. Furthermore, we find that the quality of the final product is very much improved.

In particular, we find that there is present in the dichlorodiphenylethanes as previously prepared for commercial use variable amounts of an impurity

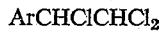

which is an oil, which lowers the set point of the product and which is not insecticidally active. This impurity can be practically eliminated or at least greatly reduced by the process of this invention.

The preparation of the chlorinated product from ethanol has been adequately described in the above noted patent in the section beginning in line 53 of column 1 of this patent. We may here use one or both layers which form during chlorination, particularly after the lower layer has reached a specific gravity above 1.2. It is preferred, however, that chlorination be continued until chlorine is taken up but slowly, at which time the preferred chlorine content of the lower layer is 50% to 60%, but the point at which chlorination is interrupted is not critical.

As an aromatic compound, there is used a member of the benzene series which has at least one nuclear position available for substitution. Useful aromatic compounds include benzene, fluorobenzene, chlorobenzene, bromobenzene, methoxybenzene, ethoxybenzene, β-chloroethoxybenzene, toluene, xylenes, ethylbenzene, propylbenzene, isopropylbenzene, n-butylbenzene, sec-butylbenzene, isobutylbenzene, and tert-butylbenzene.

These aromatic compounds may be placed in several groups. The halobenzene supply halophenyl groups in the final products in which the halogen has an atomic weight up to 80. The alkyl-substituted benzenes supply alkylphenyl groups in which the alkyl portion contains not over four carbon atoms. Another group of reactants comprises alkoxybenzenes which supply alkoxyphenyl substituents in the desired products, the alkoxy portion containing not over two carbon atoms.

The theoretical requirement is for two moles of aromatic compound per mole of the theoretical product from chlorinated alcohol, which for purposes of calculation may be treated as $C_2H_5OCHClCHCl_2$. Variations of as much as 20% or more in the above proportion are permissible.

Sulfuric acid is the condensing agent of choice for use in our process. It may commonly be the usual 95%–99% acid of commerce or acid containing up to 20% of sulfur trioxide. Sulfuric acid may in general have a strength between 90% and 120%.

In place of sulfuric acid, it is possible to use alkanesulfonic acids or arenesulfonic acids or mixtures of such acids with sulfuric acid.

The amount of condensing agent used may vary from about 0.5 mole up to about 2 moles per mole of aromatic compound to be condensed. The preferred proportion is 0.7 to 1.5 moles per mole of said compound.

To carry out the process of this invention, there are conveniently mixed the product from chlorinating alcohol and the aromatic compound. The temperature of the resulting mixture may be adjusted, a range of 0° to 30° C. being preferred. The pressure over the mixture is reduced at least below 300 mm. and preferably to a level between 20 and 100 mm. Condensing agent is gradually added with stirring. Cooling may be necessary to keep the mixture below 40° C. and preferably below 30° C. After addition of the condensing agent, the temperature of the reaction mixture may be permitted to increase or may be raised by addition of heat, a temperature level of 40° to 75° C. being used with pressures between 20 and 100 mm.

During the reaction, hydrogen chloride is evolved and is taken off. The effluent gas should be passed over a cooled surface to condense readily liquifiable products, which are permitted to flow back to the reaction mixture. The hydrogen chloride may be absorbed by an alkaline agent or otherwise disposed of.

After completion of the reaction, the reaction mixture is allowed to form layers, the lower layer containing the acid condensing agent and the upper layer the product. The layers are separated and the upper layer is washed with water. It is desirable to include an alkaline wash to ensure removal of traces of acid. Volatile material is taken off by heating, best under reduced pressure, and the product is conveniently collected as a residue. Crystalline products may, if desired, be recrystallized.

The products prepared by the above process are generally purer than those heretofore available commercially. They are more readily ground. They give solutions free of sludge. They appear more stable.

Further details of procedure are presented in the following examples, which are given by way of illustration and not by way of limitation. Parts are by weight unless otherwise designated.

*Example 1*

A reactor equipped with an agitator, thermometer, and condenser which leads to a source of reduced pressure, is charged with 637 parts of ethylbenzene and 533 parts of the lower layer of the chlorinated product obtained by passing chlorine into ethanol at about 35° C. until the specific gravity of the lower layer which results is 1.29. The charge is stirred and the pressure thereover reduced to 30 mm. The temperature of the mixture is about 25° C. A slow flow of 98% sulfuric acid into the charge is started. In about one hour 444 parts of sulfuric acid have been added at 25°–30° C. The temperature of the mixture is allowed to increase and is controlled with cooling to a level of about 60° C. with the pressure increasing to about 100 mm. The reaction mixture is stirred for another hour and a half under these conditions. Stirring is discontinued and layers are allowed to form. The lower acid layer is taken off and the organic layer is washed with 1000 parts of water, 1000 parts of aqueous 2% sodium carbonate solution, and twice more with 1000 part portions of water. During washing, the temperature is held between 50° and 80° C. The washed product is heated to 100°–105° C. at 2 to 10 mm. for an hour to remove moisture and other volatile material. The product is obtained as a residue in an amount of 801 parts. By analysis, this material contains less than 2% of

$C_2H_5C_6H_4CHClCHCl_2$

The balance is $(C_2H_5C_6H_4)_2CHCHCl_2$, chiefly as the para isomer. The yield of product is 87%. It has a setting point of 44.6° C.

When the steps above were followed, except that normal atmospheric pressure was used, there was obtained a residue of 736 parts of crude product, having a set point of less than 35° C. and containing about 30% of $C_2H_5C_6H_4CHClCHCl_2$. To obtain a better product, there is required a considerably larger proportion of condensing agent, thus showing the marked improvement in efficiency of the process of this invention.

The same procedure as used for reacting ethylbenzene with the chlorinated product from ethanol can be applied to reacting benzene, toluene, xylenes, propylbenzenes, or butylbenzenes. Important advantages of this process are evident with all of these starting materials.

*Example 2*

There are mixed 268 parts of n-butylbenzene and 178 parts of chlorinated ethanol products from the layer which has a specific gravity of 1.28. The mixture is cooled to 10° C. and there is slowly added with stirring 96% sulfuric acid to a total of 250 parts over a period of an hour while the temperature is kept below 25° C. and the pressure is held at 20–30 mm. The reaction mixture is heated to 35° C. and thereafter its temperature remains at 35°–40° C. for two hours with the pressure at 50–70 mm. The reaction product is allowed to separate. The lower acid layer is drawn off and the organic layer is washed with water, dilute sodium carbonate solution, and again with water. The washed material is dried over potassium carbonate and distilled under reduced pressure. A small forerun (13 parts) is taken off up to 192° C. at 0.25 mm. pressure. The main fraction of 276 parts is distilled at 193°–195° C./9.25 mm. It corresponds by analysis to 1,1-bis(butylphenyl)-2,2-dichloroethane. The yield is 76% of pure product. It has a refractive index, $n_D^{25}$, of 1.5496.

For purposes of comparison, a similar reaction was carried out at normal pressure. The amount of sulfuric acid, however, was increased to 638 parts. The reaction product was worked up as above. Between 113° C. and 192° C./0.25 mm. there was taken a fraction of 54 parts. This corresponded by analysis to $C_4H_9C_6H_4CHClCHCl_2$. The main fraction amounted to 218 parts, a 60% yield of 1,1-bis(butylphenyl)-2,2-dichloroethane.

By procedures entirely comparable to those described on the above examples, there may be reacted other alkylbenzenes or benzene itself to give the corresponding diphenyldichloroethanes. Thus, benzene yields 1,1-bis(phenyl)-2,2-dichloroethane, toluene gives 1,1-bis(tolyl)-2,2-dichloroethane, and propylbenzene provides 1,1-bis(propylphenyl)-2,2-dichloroethane. This last compound is obtained as an oily residue which distills at 176°–7° C./0.5 mm. for the p-n-propyl compound. The purified compound can then be solidified and melts at 43°–45° C. which is particularly effective toxicant against the Mexican bean beetle, as is also the butyl homologue. It is also active against red spiders and the army worm.

*Example 3*

There are charged to a reactor 675 parts of chlorobenzene and 532.5 parts of the chlorinated products from ethanol, the lower layer of which was carried to a specific gravity of 1.30. (at 20° C.). This mixture is cooled to 10° C. and the pressure thereover reduced to 25 mm. A charge of 840 parts of 105% sulfuric acid is gradually added over a period of 3 hours, while the temperature of the reacting mixture is maintained at 10°–15° C. with the aid of cooling. The pressure is held at 25–40 mm. and the mixture is agitated at 10° to 15° C. for another 3 hours. Cooling is discontinued while stirring is continued. Over a two hour period, the temperature rises to 40° C. and is then raised to 45°–50° C. while the pressure is held at 40–50 mm. and stirring is continued under these conditions for five hours. The temperature is then raised to 65° C. Stirring is discontinued and layers are allowed to form. The lower acid layer is withdrawn and the upper layer is washed in the same way as in Example 1. The washed material is heated to 105° C. with the pressure reduced to about 2 mm. for about one hour. There remains 797 parts of product of practically pure 1,1-bis(chlorophenyl)-2,2-dichloroethane (chiefly the para isomer), having a set point of 90.4° C. The usual material heretofore available has a set point of about 86° C.

In a comparable preparation performed at atmospheric pressure with three times the above quantity of sulfuric acid and longer times of reaction, there can be removed from the residue when it is heated at 150° C./0.5 mm. about 10% of its weight of an oil, $ClC_6H_5CHClCHCl_2$. In contrast, the residue above obtained from the reaction under reduced pressure gives only 0.8% of volatile material when heated at 150° C./0.5 mm.

With the halogenated benzenes as starting materials, it is generally desirable to use more than a mole of sulfuric acid per mole of aromatic starting compound. Without reduction of pressure, considerable excesses are necessary while under reduced pressures, excess up to 2.5 moles of acid per mole of the starting aromatic compound are useful. With observance of this recommendation, there are readily obtained good yields of bis(bromophenyl) dichloroethane and bis(fluorophenyl) dichloroethane. In both cases, shorter times of reaction, reduced proportions of condensing agent, better yields, and purer products with greater productivity are permissible when reduced pressures are used as compared with previous processes.

*Example 4*

There are mixed at 10°–12° C. 216 parts of anisole and 177 parts of chlorinated products from ethanol, the lower layer of which has a specific gravity of 1.29. The pressure thereover is reduced to about 50 mm. Thereto is slowly added with stirring and cooling 99% sulfuric acid to a total of 99 parts. Cooling is then discontinued and the temperature rises to about 40° and is held at 40°–45° C. for three hours with the pressure at 50–55 mm. The reaction mixture is worked up as in Example 1. The product is obtained as a residue in a yield of 88.2% of pure 1,1-bis(p-methoxyphenyl)-2,2-dichloroethane, having a set point of 95.6° C. The product contains by analysis 22.9% of total chlorine (22.8% calculated) and 11.5% of hydrolyzable chlorine (11.4% calculated).

It is preferred that the chlorinated products from ethanol be those separating as the lower layer subsequent to chlorination. As indicated above, however, the total chlorinated mixture may be used. Furthermore, chlorinated products in the upper layer may be utilized. In this last case, the preferred procedure is to extract the upper layer with the aromatic reactant and to use the resulting mixture of extract and aromatic compound. When the total mixture or the upper layer is to be reacted, the sulfuric acid should be of a strength over 100% for best efficiency.

Some of the advantages of the process of this invention have already been mentioned such as more rapid reaction use of smaller proportions of condensing agent, greater productivity and efficiency for a given size of equipment and purer material in somewhat improved yield. Because of better purity, the products tend to have better biological activity for a given weight. Also, when solid products are at hand, the materials produced by the method of this invention are more readily ground and more readily dispersible in wettable powders and dusts. They give better solutions in organic solvents and avoid the formation of sludge in concentrated solutions. There is some evidence of improved stability of the products prepared as herein described. The products thus are not only more efficiently produced but become more useful than previously known substances of the type.

We claim:

1. A process for preparing compounds of the formula

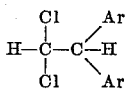

wherein Ar represents a member of the class consisting of phenyl, halophenyl, in which the halogen substituent has an atomic weight up to 80, alkylphenyl in which the alkyl group contains not over four carbon atoms, and alkoxyphenyl in which the alkoxy group contains not over two carbon atoms, which comprises mixing an aromatic compound of the benzene series corresponding to Ar with the reaction product formed by reacting ethanol with chlorine at 10° to 50° C. until two layers result, until the specific gravity of the lower layer is at least 1.2, but not beyond a chlorine content of 60% for the lower layer, adding thereto sulfuric acid as a condensing agent with the pressure below 300 mm. reacting said aromatic compound and said reaction product while maintaining pressure thereover below 200 mm. of mercury, reaction temperatures being between 0° and 75° C.

2. A process for preparing compounds of the formula

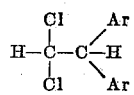

wherein Ar represents a member of the class consisting of phenyl, halophenyl in which the halogen substituent has an atomic weight not over 80, alkylphenyl in which the alkyl group contains not over four carbon atoms, and alkoxyphenyl in which the alkoxy group contains not over two carbon atoms, which comprises mixing (1) an aromatic compound of the benzene series having at least one nuclear position available for substitution and corresponding to Ar above and (2) the reaction product formed as a lower layer by chlorinating ethanol at 10° to 50° C. until two layers result, until the specific gravity of the lower layer is at least 1.2, but not beyond a chlorine content of 60% for the lower layer, adding to the resulting mixture at a pressure below about 100 mm. and at a temperature between 0° and 40° C. from about 0.5 to 2 moles per mole of aromatic compound to be condensed of sulfuric acid of 90% to 120% strength, and completing the reaction of said compound and said reaction product in the presence of the added sulfuric acid at a pressure below 100 mm. and a temperature between 40° and 75° C.

3. A process for preparing 1,1-bis(chlorophenyl)-2,2-dichloroethane which comprises mixing chlorobenzene and the reaction product formed as a lower layer by chlorinating ethanol at 10° to 50° C. until two layers result, until the specific gravity of the lower layer is at least 1.2, but not beyond a chlorine content of 60% for the lower layer, adding to the resulting mixture at a pressure below about 100 mm. and at a temperature between 0° and 40° C. sulfuric acid of 95% to 120% strength, and completing condensing said chlorobenzene and said reaction product in the presence of the added sulfuric acid at a pressure below 100 mm. and a temperature between 40° and 75° C.

4. A process for preparing 1,1-bis(ethylphenyl)-2,2-dichloroethane which comprises mixing ethylbenzene and the reaction product formed as a lower layer by chlorinating ethanol at 10° to 50° C. until two layers result, until the specific gravity of the lower layer is at least 1.2, but not beyond a chlorine content of 60% for the lower layer, adding to the resulting mixture at a pressure below about 100 mm. and at a temperature between 0° and 40° C. sulfuric acid of 95% to 120% strength, and completing condensing said ethylbenzene and said reaction product in the presence of the added sulfuric acid at a pressure below 100 mm. and a temperature between 40° and 75° C.

5. A process for preparing 1,1-bis(methoxyphenyl)-2,2-dichloroethane which comprises mixing anisole and the reaction product formed as a lower layer by chlorinating ethanol at 10° to 50° C. until two layers result, until the specific gravity of the lower layer is at least 1.2, but not beyond a chlorine content of 60% for the lower layer, adding to the resulting mixture at a pressure below about 100 mm. and at a temperature between 0° and 40° C. sulfuric acid of 95% to 120% strength and completing condensing said anisole and said reaction product in the presence of the added sulfuric acid at a pressure below 100 mm. and a temperature between 40° and 75° C.

6. A process for preparing 1,1-bis(butylphenyl)-2,2-dichloroethane which comprises mixing butylbenzene and the reaction product formed as a lower layer by chlorinating ethanol at 10° to 50° C. until two layers result, until the specific gravity of the lower layer is at least 1.2, but not beyond a chlorine content of 60% for the lower layer, adding to the resulting mixture at a pressure below about 100 mm. and at a temperature between 0° and 40° C. sulfuric acid of 95% to 120% strength, and completing condensing said butylbenzene and said reaction product in the presence of the added sulfuric acid at a pressure below 100 mm. and a temperature between 40° and 75° C.

7. A process for preparing 1,1-bis(propylphenyl)-2,2-dichloroethane which comprises mixing propylbenzene and the reaction product formed as a lower layer by chlorinating ethanol at 10° to 50° C. until two layers result, until the specific gravity of the lower layer is at least 1.2, but not beyond a chlorine content of 60% for the lower layer, adding to the resulting mixture at a pressure below about 100 mm. and at a temperature between 0° and 40° C. sulfuric acid of 95% to 120% strength, and completing condensing said propylbenzene and said reaction product in the presence of the added sulfuric acid at a pressure below 100 mm. and a temperature between 40° and 75° C.

References Cited in the file of this patent

UNITED STATES PATENTS

| | | |
|---|---|---|
| 2,464,600 | Meitzner et al. | Mar. 15, 1949 |
| 2,547,689 | Cass | Apr. 3, 1951 |
| 2,788,374 | Stair | Apr. 9, 1957 |